(12) United States Patent
Hill et al.

(10) Patent No.: US 11,316,747 B2
(45) Date of Patent: Apr. 26, 2022

(54) METHOD AND SYSTEM FOR EFFICIENT MULTI AGENT COMPUTER SIMULATION

(71) Applicant: Simudyne Ltd., London (GB)

(72) Inventors: John Hill, London (GB); Chris Spencer, London (GB)

(73) Assignee: Simudyne Ltd., London (GB)

( * ) Notice: Subject to any disclaimer, the term of this patent is extended or adjusted under 35 U.S.C. 154(b) by 0 days.

(21) Appl. No.: 16/386,834

(22) Filed: Apr. 17, 2019

(65) Prior Publication Data

US 2020/0252298 A1    Aug. 6, 2020

Related U.S. Application Data

(60) Provisional application No. 62/802,105, filed on Feb. 6, 2019.

(51) Int. Cl.
  *H04L 12/24* (2006.01)
  *G06F 16/901* (2019.01)
  *G06F 30/20* (2020.01)
  *H04L 41/14* (2022.01)

(52) U.S. Cl.
  CPC ........ *H04L 41/145* (2013.01); *G06F 16/9024* (2019.01); *G06F 30/20* (2020.01)

(58) Field of Classification Search
  CPC ..... H04L 41/145; G06F 16/9024; G06F 30/20
  See application file for complete search history.

(56) References Cited

U.S. PATENT DOCUMENTS

| | | | | |
|---|---|---|---|---|
| 10,133,575 | B2* | 11/2018 | Greiner | H04L 9/0869 |
| 2010/0274663 | A1* | 10/2010 | Hinton | G06Q 30/0246 |
| | | | | 705/14.43 |
| 2013/0297477 | A1* | 11/2013 | Overman | G06Q 40/00 |
| | | | | 705/37 |
| 2014/0223148 | A1* | 8/2014 | Inglett | G06F 7/58 |
| | | | | 712/225 |
| 2015/0095368 | A1* | 4/2015 | Koppes | G06F 16/212 |
| | | | | 707/769 |
| 2020/0012734 | A1* | 1/2020 | Lee | G06F 16/2455 |

OTHER PUBLICATIONS

Im Blythe and Alexey Tregubov,FARM: Architecture for Distributed Agent-Based Social Simulations, Information Sciences Institute, Marina del Rey, CA 90292, USA (Year: 2018).*
11Blythe Jim et al: FARM: Architecture for Distributed Agent-Based Simulations11 , Jul. 14, 2018 (Jul. 14, 2018).

(Continued)

*Primary Examiner* — John M Macilwinen
*Assistant Examiner* — Monishwar Mohan
(74) *Attorney, Agent, or Firm* — Ted Sabety; Sabety +associates, PLLC (57) ABSTRACT

This invention relates to using topological analysis of a graph representing a multi agent computer simulation in order to allocate agents to a multiprocessing computer system so as to optimize the calculation of the simulation.

21 Claims, 5 Drawing Sheets

(56) References Cited

OTHER PUBLICATIONS

Donghui Lin et al: "Massively Multi-Agent Systems II", Massively Multi-Agent Systems II: International Workshop, MMAS 2018, Stockholm, Sweden, Jul. 14, 2018, Revised Selected Papers, Jul. 14, 2018 (Jul. 14, 2018), XP055686607, Cham ISBN: 978-3-030-20937-7 Retrieved from the Internet: URL:http://link.springer.com/content/pdf/10.1007/978-3-030-20937-7.pdf [retrieved on Apr. 16, 2020] pp. 103-114.
IBM "IBM System Blue Gene/Q", Nov. 30, 2011 pp. 1-6 ZPO55689358. http://www.fz-juelich.de/sharedocs/downloads/ias/jsc/en/juqueen/bgqibmdatasheet.pdf?_blob=publicationfile . Retrived Apr. 27, 2020.
Marquez Claudio et al: "Graph-Based Automatic Dynamic Load Balancing for HPC Agent-Based Simulations", Dec. 18, 2015 (Dec. 18, 2015), International Conference on Financial Cryptography and Data Security; [Lecture Notes in Computer Science; Lect.Notes Computer], Springer, Berlin, Heidelberg, pp. 405-416, XP047344710, ISBN: 978-3-642-17318-9 [retrieved on Dec. 18, 2015] abstract pp. 3-7.

\* cited by examiner

| Agents | 1 | 2 | 3 | 4 | 5 | 6 | 7 | 8 | 9 | 10 |
|---|---|---|---|---|---|---|---|---|---|---|
| 1 | — | — | — | — | — | — |   |   |   |   |
| 2 | — | — |   |   |   |   |   | — |   |   |
| 3 | — |   | — |   |   |   |   |   |   |   |
| 4 | — | — | — |   |   |   |   |   | — |   |
| 5 |   |   | — |   |   |   |   |   |   |   |
| 6 | — |   |   |   |   |   |   |   |   |   |
| 7 |   |   |   |   |   |   |   |   | — |   |
| 8 |   | — |   | — |   | — |   |   | — |   |
| 9 |   |   |   |   |   |   |   | — | — | — |
| 10 |   |   |   |   |   |   |   | — |   | — |

# METHOD AND SYSTEM FOR EFFICIENT MULTI AGENT COMPUTER SIMULATION

PRIORITY CLAIM

This is a utility application which claims the benefit of U.S. Provisional Patent Application No. 62/802,105 filed on Feb. 6, 2019, which is hereby incorporated by reference in its entirety for all that it teaches.

FIELD OF INVENTION

This relates to multi-agent computer simulation.

BACKGROUND

Computer modeling has developed over the years to permit simulations of physical processes. For example, simulations of nuclear device explosions have been used to determine the qualities of a weapon without actually setting one off. These kinds of simulations operate by setting up data structures that represent defined regions in a cartesian space and then calculating physical processes within each region for a sequence of time slices using physics equations and propagating physical effects between the regions as input into the processing of the regions in the next time slice. As these simulations become more granular, that is, the regions become smaller and the time slices shorter, the computer workload increases significantly. To address this, techniques have been devised to utilize more than one computer to execute the simulation. In this approach, there arises the inevitable process of how to assign portions of the workload to different computers in order that the overall simulation execute quickly using the machines together. In some cases, computers are assigned one or more adjacent or proximate regions, and then the propagation of inter-region effects in the simulation occur internally to the computer for the regions that it is calculating and otherwise are communicated to another computer that is simulating the adjacent regions that the first computer is not calculating. How the computers are allocated the simulation regions therefore can affect how much communication processing has to be conducted between the computers—often an aspect of the entire simulation process that impedes its execution speed. When departing from simulations of cartesian space to other types of simulations, for example, multi-agent modeling, this problem becomes acute.

SUMMARY

This invention relates to using topological analysis of a graph representing a multi agent computer simulation in order to allocate agents to a multiprocessing computer system so as to optimize the calculation of the simulation.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

More recently has arisen the notion of agent-based simulation. In this formalism, the simulated world is populated with agents, each agent representing an actor in the simulated world. Each agent can be its own model: it is comprised of a data structure representing a current state of the actor, and a computer process that represents a dynamic model of that actor. The process that calculates the next state of the actor as function of the current state plus any inputs. A simulation of a highway interchange may include as agents individual cars. Each car may have a state represented by a vector of values, like speed, direction, gas pedal pressure, brake pedal pressure, position of steering wheel. The computer modeled function for the agent process may increase or decrease the speed based on the gas pedal pressure and brake pedal pressure as inputs into the function. If the simulation involves 100 cars, there may be 100 of these data structures and instances of the computer process modeling the dynamics of a car. Similarly, in an economic context, a simulation of several corporate entities may model each corporation as an agent-model. That is, a computing abstraction that models that specific corporation: where its state vector may include values representing its cash holdings, employee pay, number of employees, per employee product output, and product pricing. Or it may include another agent-model for a customer: amount of cash, demand for product as function of price, frequency of purchase.

Figure 1:
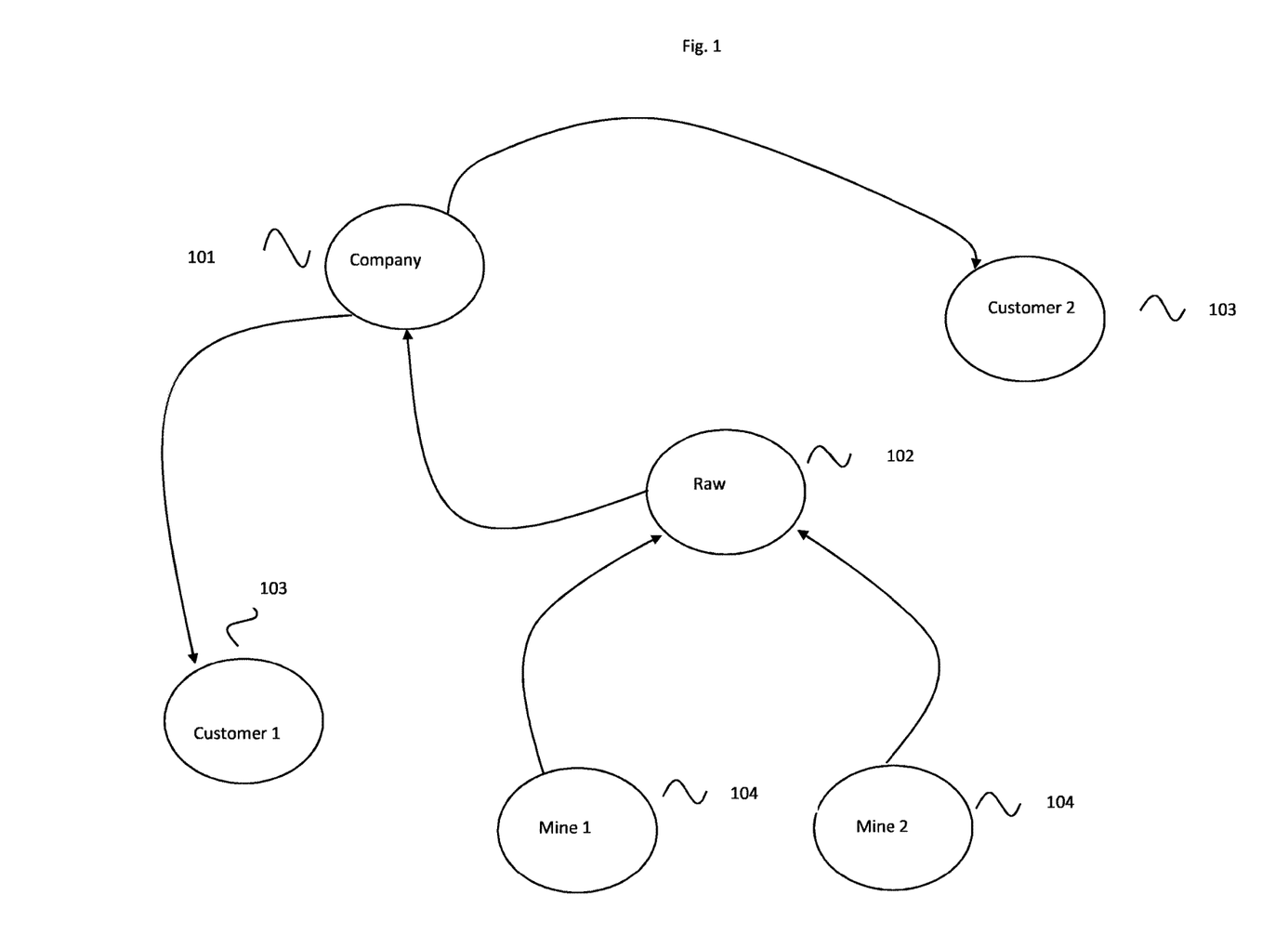
FIG. 1: an example of a graph where the interaction arcs between the agent models is shown

These sorts of simulations are different from simulations involving spatial or cartesian regions. In these types of multi agent simulations, the propagation of effects of one agent-model function to other agents is not necessarily related to any spatial distance. For example, a company agent-model may have two customer agents that are physically far apart, (See FIG. 1, 101) but linked to the company by being customers. These types of multi agent simulations can be analyzed as a graph. Each node of the graph represents an agent-model of an actor in the simulated world. Each arc of the graph, referred to as an interactivity arc, represents an instance of an interaction between one agent and another. For example, an agent that is modeling a raw materials supplier (102) may have an interaction with the company agent-model (101), but not the customer agent-model (103). Yet the customer-agent models (103) do not interact with the raw materials supplier (102) or the mines (104) that sell to the raw materials supplier (102). That interaction may be a purchase of the raw material, and is simulated by a data message that passes between the two nodes in the graph, that is, along the interactivity arc between the two nodes in the graph. Likewise, the customer agent-models may have an interaction arc with the company agent-models, but not the mine agent-model. FIG. 1 shows an example of a graph where the interaction arcs between the agent models is shown. While FIG. 1 shows a very simple example for purposes of disclosing the invention, in practice, the simulation may have thousands of agents with tens of thousands or more interactivity arcs—thus requiring an automatic process that organizes the simulation itself.

In one embodiment, and more formally, an agent-model i can be represented by a state vector of length n at time t $S_{i,t}=(s_1, s_2, \ldots, s_n)$ and a function that determines the next state vector $S_{i,t+1}=F_i(S_i, t, I_t)$, where $S_{i,t+1}$ is the state vector for agent-model I at time t+1, and $I_t$ is the interaction matrix I at time t. The agent is also represented by a set of pointers or addresses that are the locations of the data structures representing the agents it interacts with. This may also be represented by an interaction matrix I that is comprised of elements i,j that represent an effect received by agent model i from agent model j. These values may also may be distinct function outputs, or outputs of the function $F_i$. The agent process runs the functions to determine the output of that agent process at time t. This too may be an output vector. Where the matrix element i,j is null, there is no interaction. Thus, the graph may be represented by this kind of matrix, which indicates which of the agent-models interact with the others. The state vectors, output vectors and interactivity matrix may be stored as a data structure, or combination of data structures in a computer system.

Figure 2:
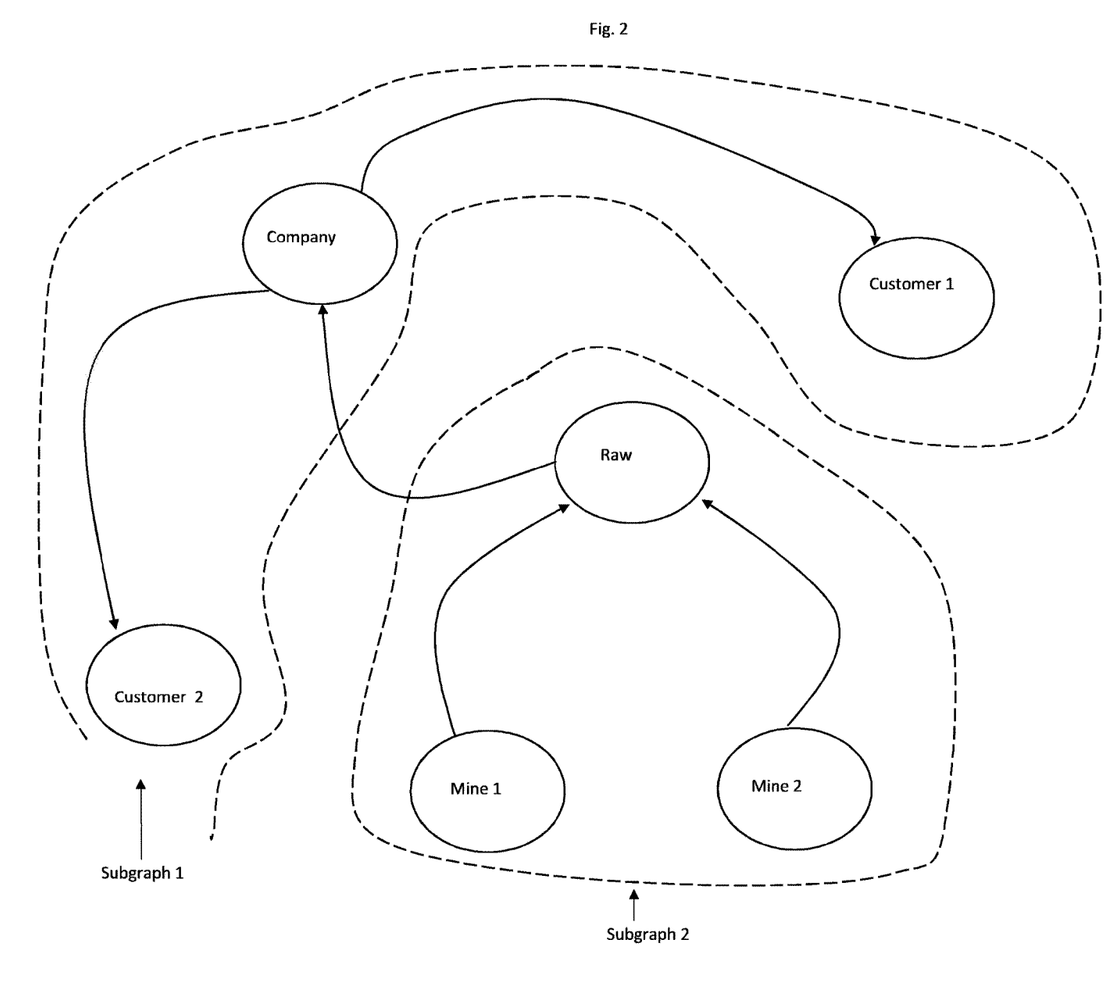
FIG. 2: an exemplary sub-graph allocation that results in one arc between the subgraphs

With this type of simulated world, there may be many agent-models, each simulating an actor. As noted above, these types of simulations may involve thousands of agents, involving hundreds of models, and tens of thousands or more of interactivity arcs among them. As a result the matrix may be very large—while also being relatively sparse. Not every actor interacts with every other actor. Further, a subgraph of the agent-models may have many interaction arcs with a few other agents in that sub-graph, and then a few interaction arcs with another subgraph of agents. That is, the agent-model graph could be comprised of sub-graphs where this a lot of interaction arcs, and then a few interaction arcs between the sub-graphs. An example of this situation could be represented by the matrix appearing in FIG. 2. In this case, the simple graph of FIG. 1 is separated into to sub-graphs where there is only one arc or edge between the two subgraphs. Any other sub-graph allocation would result in two arcs between the two subgraphs.

Figure 3:
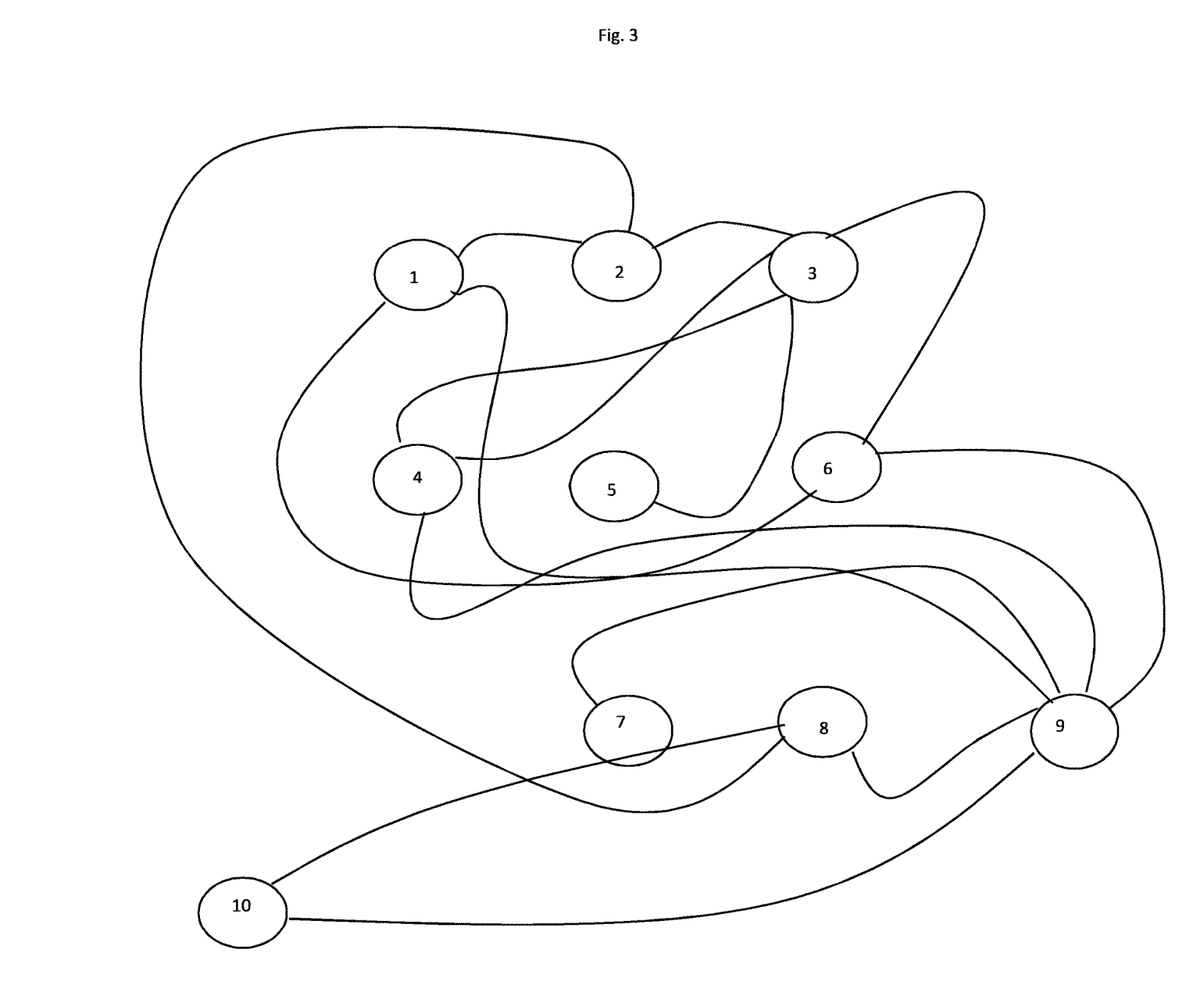
FIG. 3: shows an exemplary agent-model graph of 10 agents showing representative interactivity arcs between the agents.
Figure 4:
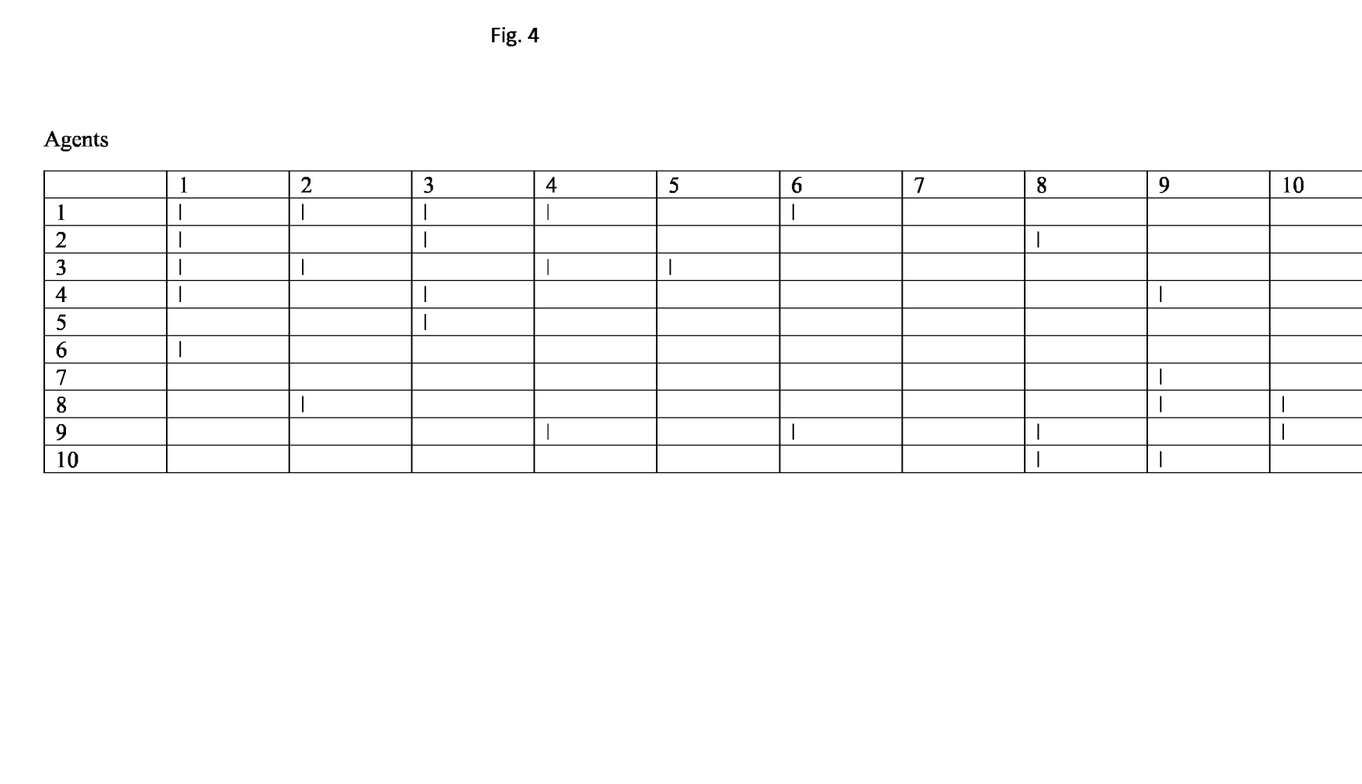
FIG. 4: shows an example matrix representation of the interactivity arcs of FIG. 3.

A more complex example is shown in FIG. 3, where there are 10 agents. Agents 1-4 have many interaction arcs between them, and agents 8-10 have many interaction arcs between them. However, there are fewer interaction arcs between members of the two groups. FIG. 4 shows an interactivity matrix representing the graph depicted in FIG. 3.

Each agent in the simulation may be treated as a node in a graph. Computationally, the agent may be represented by a data structure comprised of references to other agent-nodes, where the references are pointers or address of the other data structure. If two agent-models share the computer, the addresses may be memory addresses or global variables in the simulation engine running on the computer. If they are on different computers, it may be a URL or other network address with a slug that automatically causes one computer to transmit a data message to the other with appropriate data that results in the simulation engine running on the destination computer receiving the data and assigning it to the correct agent-model running on the receiving machine. When the simulation is set up on the computer system, the agent processes have to be allocated to the computers comprising the system. That is, the data structures for each agent that represent the interactivity arcs have to generated and stored in order for the simulation to commence. This requires automatically determining which agent processes (and their corresponding related data structures) are to be executed on which computers.

Figure 5:
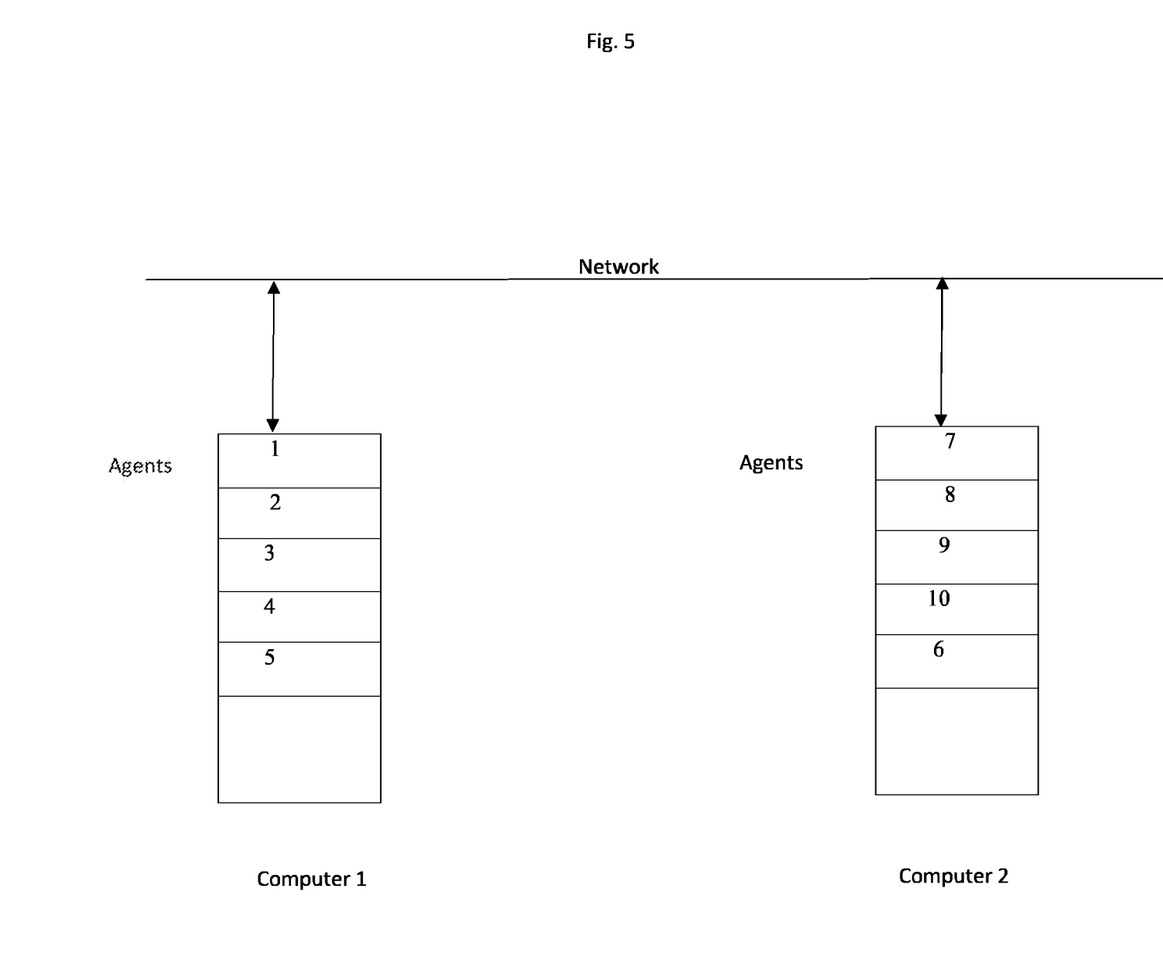
FIG. 5: shows an allocation of the agents of FIGS. 3 and 4 across two computers.

The depiction in FIG. 5 shows how the agent-model processes shown in FIGS. 3 and 4 should be automatically allocated to different computers in order to minimize the communication traffic between the computers. Where one agent has an interaction with another, there will be a communication between the agents. If two agents communicating are being calculated on the same computing machine, this involves locally storing values with in that some machine. If the two agents are on two separate computing machines, that requires a communication network process to transmit data from one agent process to the other. This may be accomplished by transmitting a data message from one computer to the other, where the data message is comprised of addressing that indicates the source computer and destination computer, along with addressing indicating which agent in the source computer was the source agent and which agent in the destination computer is the destination agent. Alternatively, each interactivity arc may be represented by an identifier number unique to the arc, and the message simply include that identifier. The destination computer can then utilize another data structure that maps the arc identifier to the destination agent. In the example presented in FIG. 4, each of the two groups should be assigned to two separate computers so that the communication required arising from agent interaction is minimized to the few arcs between the two groups. In this simple example, the only cross-machine communication is between agents 6 and 1, 4 and 9, and 2 and 8.

More formally, the allocation of multiple agent-models in a given simulation among multiple computers uses the topology of the graph representing the interactions between the agent-nodes to automatically assign the nodes to computer machines in order to minimize the inter-machine communication bandwidth or latency (whichever the concern is.) This involves the computer system running an analysis of the graph representing dimensionless agents, and does not rely on any cartesian space or geography. The allocation process automatically looks for cliques of agents, or sub graphs in the graph that are most densely connected that can be assigned to a single machine. In one embodiment, the number of sub graphs that are determined may be a function of the number of machines available to compute the overall simulation.

In one embodiment, cliques, or subgraphs may be automatically identified by analyzing the interactivity matrix. See FIG. 4. In this embodiment, the matrix can be subject to a convolution applied to the matrix values using a predetermined kernel to create a new matrix representing the relative amount connectivity in the graph where the adjacency is of the indices i,j and not necessarily any actual cartesian locality.

Another approach is to use the number of computing machines to determine a number of target subsets and then divvy up the nodes into every possible allocation with that number of subsets. For example, if there are 100 nodes and 10 machines, the first attempt would have 91 nodes in a first machine and 1 node each in the remaining 9. The last allocation would have 1 node in the first machine, 1 node in each of the next 8 machines and 91 nodes in the tenth machine. For each allocation, the allocation process calculates the number of arcs that traverse between subsets. This is determined by examining for each subset in a given allocation attempt, the number of pointers in the data structures representing the agents within a subset that point to data structures representing agents-models that are not part of the subset. The total number of cross-subset arcs for a given allocation may constitute a score for that allocation. The score represents how much communication overhead can be expected if the agent allocation to the computers is made in accordance with that attempt. Then the allocation process can select the allocation with the lowest score, i.e. the least number of cross sub-graph arcs, as the allocation requiring the least inter-computer communications. In other words, the range of possible allocations for agents onto machines is checked to determine which allocation produces the least expected communication overhead between machines.

This approach may be refined because in some cases there may be a degenerate result, where the first allocation simply houses the entire simulation in the first machine and obtains a zero score because no inter-computer communication is necessary. This is alleviated by also scoring for each allocation the expected computer workload for each machine as a result of each sub-graph allocation. The expected workload for running the allocated agent-nodes in that subgraph on the allocated machine may be calculated. Those allocation attempts that result in calculating an expected workload on one of the machines that is over a predetermined threshold, or results in under-utilized machines may be discarded. In one embodiment, the maximum workload value of the machines is added to the allocation score. In this way, the minimum allocation score can represent on balance the most efficient allocation of nodes into subgraphs so that the computing workload and the communication workload optimized. An example score for an allocation may be represented by the calculation $V=aC+bW$, where a and b are empirical constants and C represents the number of cross-subset arcs for that allocation and W the amount of compute workload for the busiest machine assigned a subgraph for that allocation. The workload may be determined automatically in a number of ways. In one embodiment, the number of nodes assigned to a single machine can be a proxy for workload.

In another embodiment, it may be the number of interactivity arcs internal to the subgraph that are assigned to a single machine. In yet another embodiment, past run data from utilizing the simulation may be used to inform this automatic allocation. For example, if the simulation has been run before and a particular subgraph has generated an excessive workload, this may be represented by numerical data stored by the system indicating the number of computer processing cycles utilized for that subgraph, or the time needed to complete the calculation of a simulated time slice. That time period can be viewed as a workload score W for that machine with that allocated subgraph.

Then the possible allocations are stored as data structures representing M groups of the N nodes, along with its score. M represents the number of computing machines and the N is the number of agents in the simulation. An example data structure for an allocation is an array, where each clique has a delimiter and until the next clique delimiter lists pointers to the agents in that clique, followed at the end by the score delimited and then the constituent scores:

Attempt I (start clique1, agent11, agent 12 . . . , start clique2, agent21, agent22 . . . , start clique M, agent M1, agent M2 . . . , Score C, W, V)

In this way, a computer organizing the simulation can sort through the Allocation data structures locating the allocation structure with the least V or other score that may be used (for example, the minimum compute workload W or communication overhead C).

Other heuristic approaches may be used for the automatic allocation, for example, first selecting the node with the largest number of arcs, and working outward along its arcs to its connected neighboring nodes incrementing the subset with the neighboring nodes until the number of arcs within the subset does not increase above a predetermined threshold and calling that a given clique. The next node to consider is one not in an assigned subset but with the largest number of arcs. The process is repeated until all node are assigned to some subset. Any remaining nodes are then assigned to the subset that they connect with. This process may be used in combination with compute workload results in order to avoid degenerate results. Further, search algorithms may be applied that search for the best allocation that minimizes the score.

Pseudo code steps may be programmed recursively, for example:

Determine NODE, that has the unassigned node with the largest number of arcs;
FindClique(Node);
FindClique (Pointer to Node){
Form subset, include Node into subset, set the number of subset arcs to the number of arcs for Node;
For each neighboring node of Node, Do{
Add the neighboring node to the subset;
Increase the number of subset arcs by the number of subset arcs of the neighboring node minus one for the arc that is now internal to the subset;
}
Determine the change in the number of external subset arcs for the Node and its neighboring nodes;
If (the change in the number of subset arcs is less than a predetermined threshold number){return;}
Else: FindClique(next neighboring node);
/*
This pseudo-code, if expressed as actual code, must utilize known processes for traversing a tree data structure in order that each neighboring node is processed recursively as "Node", until the branch of the tree has arc connections that are too sparse, based on the predetermined threshold.
*/
}//End of FindClique When the recursive process completes, it has assembled a subset of nodes that constitute a clique, with a few arcs that traverse outside the subset. Then, the next unassigned node with the largest number of arcs can be selected and the recursive function called again. This process repeats until there are a few nodes left, which may be arbitrarily assigned to their arc-neighbor.

Once the optimal allocation of agent-nodes has been determined, the simulation can be initiated. A central machine that controls the overall simulation process can transmit messages to the constituent machines representing commands to initiate the allocated number of agent-models of a particular type that are assigned to that machine. In the simple example of FIG. 1, there are 4 types of agents being used: customer, company, raw material supplier, mine. Each may have its own type of function to go along with its state vector. For example, the organizing computer can parse the best Allocation data structure and for each clique n, transmit the data representing the agent data structures in that clique to the nth computer. When the parser gets to the next clique delimiter, it can start transmitting the agent data structures for that clique to the next computer.

In addition, any inter-machine addressing can be included with the transmissions as the arcs that will traverse between machines. Further, initial data may be distributed as well. At that point, the agent data structures are initiated in each machine and the simulation may commence for the next cycle or time-slice. When that occurs, there will be inter-machine data messages representing the interactivity arcs between the sub-graphs of the overall graph representing the relationship of the agent-nodes in the simulation.

Operating Environment:

The system is typically comprised of one or more servers that are connected by a data network to each other and a user's computer. See FIG. 4. The central server may be comprised of one or more computers connected to one or more mass storage devices. In one embodiment, a central server or the user computer determines the agent allocation and then distributes data to the other computers in the system, representing allocated agents for each of the computers. In another embodiment, the allocation process itself is distributed among the computers running the simulation. This may be the case where the allocation is dynamic. In this embodiment, the central server or user computer that administrates the simulation has a data structured stored that represents the allocation of the agents to the other computers in the system. The administrating computer may receive data messages from these computers indicating their current workload running the simulation. The administrating computer can run a process that determines whether the workload or communications overhead for a first given computer is too high and a second given computer too low, and as a result, issue instructions in the form of data messages to both computers to assign one or more agents from one computer to the other. In other words, the allocation process may be run dynamically based on the actual workload data received from the computers running the simulation, and then the agents re-assigned based on that dynamic result. When the reassignment occurs, the first computer will transmit to the second computer the data representing the agents state vectors, output states, input states and connectivity matrix for that time slice when the re-allocation occurs.

In the case where the current allocation is detected to be out of balance, one or more cliques can be redetermined; Then a set of message constructed to the current machines with the list of agents being reassigned, with instructions to send these agents to the other machines designated in the message as the new assignment. This can be accomplished as a push from the current machine to the new machine, or by sending the instructions to the destination, a fetch from the new machine from the old machine, and then updating the data structures on the source and destination machines as to whether an agent to agent communication arc is going off machine or staying internal. In addition, the simulation will have to be suspended while this transfer takes place. However, this suspension may be only the machines involved in the reallocation process, and any machines with agents dependent on the agents run by the suspended machines.

The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, hand-held computers, laptop or mobile computer or communications devices such as cell phones, smart phones, and PDA's, multiprocessor systems, microprocessor-based systems, set top boxes, programmable consumer electronics, network PCs, minicomputers, mainframe computers, distributed computing environments that include any of the above systems or devices, and the like. Indeed, the terms "computer," "server," and the like may be used interchangeably herein, and may refer to any of the above devices and systems.

The user environment may be housed in the central server or operatively connected to it. In one embodiment, the user's computer is omitted, and instead an equivalent computing functionality is provided that works on a server. In this case, a user would log into the server from another computer and access the system through a user environment, and thereby access the functionality that would in other embodiments, operate on the user's computer. Further, the user may receive from and transmit data to the central server by means of the Internet, whereby the user accesses an account using an Internet web-browser and browser displays an interactive web page operatively connected to the central server. The server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space displayed by the browser have different URL's. That is, the webpage encoding the simulated space can be a unitary data structure, but different URL's reference different locations in the data structure. The user computer can operate a program that receives from a remote server a data file that is passed to a program that interprets the data in the data file and commands the display device to present particular text, images, video, audio and other objects. In some embodiments, the remote server delivers a data file that is comprised of computer code that the browser program interprets, for example, scripts. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location. The HTML can also have references that result in other code modules being called up and executed, for example, Flash or other native code.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two respective remote computers to exchange information by means of digital network communication. As a result a data message can be one or more data packets transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that one server or the user's computer is connected through a fire wall to another proxy server, which routes communications to another server that executes the disclosed methods.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, using TCP/IP or the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, a relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The CPU may perform logic comparisons of one or more of the data items stored in memory or in the cache memory of the CPU, or perform arithmetic operations on the data in order to make selections or determinations using such logical tests or arithmetic operations. The process flow may be altered as a result of such logical tests or arithmetic operations so as to select or determine the next step of a process. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades or brightness. The user interface may also display a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a two dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), any form of 802.11.xx or Bluetooth.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C++, C#, Action Script, PHP, EcmaScript, JavaScript, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form. The logic described herein may be expressed by the computer code. For example, where the disclosure recites a determination whether a condition exists, this may be accomplished by the computer code including a conditional branching statement using Boolean logical condition, and then that statement resulting in alternative processes steps being executed based on the data representation of the condition being determined. In other embodiments, where the disclosure recites a determination, it may be that the computer executes program steps that run a calculation using data representing input state conditions in order to calculate data as a result that represents such a determined result.

The invention may be described in the general context of computer-executable instructions, such as program modules, being executed by a computer. Generally, program modules include routines, programs, objects, binary components that, when executed by the CPU, perform particular tasks or implement particular abstract data types and when running, may generate in computer memory or store on disk, various data structures. A data structure may be represented in the disclosure as a manner of organizing data, but is implemented by storing data values in computer memory in an organized way. Data structures may be comprised of nodes, each of which may be comprised of one or more computer memory locations into which is stored one or more corresponding data values that are related to an item being represented by the node in the data structure. The collection of nodes may be organized in various ways, including by having one node in the data structure being comprised of a memory location wherein is stored the memory address value or other reference, or pointer, to another node in the same data structure. By means of the pointers, the relationship by and among the nodes in the data structure may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database, or as a flat, parsable file. The processes may load the flat file, parse it, and as a result of parsing the file, construct the respective data structure in memory. In other embodiment, the data structure is one or more relational tables stored on the mass storage device and organized as a relational database.

The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card, SD Card), or other memory device, for example a USB key. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., a disk in the form of shrink wrapped software product or a magnetic tape), preloaded with a computer system (e.g., on system ROM or fixed disk), or distributed from a server, website or electronic bulletin board or other communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Where the disclosure refers to matching or comparisons of numbers, values, or their calculation, these may be implemented by program logic by storing the data values in computer memory and the program logic fetching the stored data values in order to process them in the CPU in accordance with the specified logical process so as to execute the matching, comparison or calculation and storing the result back into computer memory or otherwise branching into another part of the program logic in dependence on such logical process result. The locations of the stored data or values may be organized in the form of a data structure.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A computer system comprised of at least one servers operatively connected using a data network for operating a multi agent process simulation, comprising:
a computer memory comprised of an interactivity arc data structure, said interactivity arc data structure comprised of data representing a plurality of interactivity arcs, said plurality of interactivity arcs further comprised of at least one interactivity arc encoding a direct communication link between a first agent process comprising the multi-agent simulation and a second agent process comprising the multi-agent simulation; and
the computer memory is further comprised of program data that when executed by the computer system causes the system to use the interactivity arc data structure to automatically allocate the agent processes to be executed by the at least one servers by determining an allocation of agent processes to servers that minimizes either the expected volume of direct data communications between pairs of agents residing on different servers or the expected number of direct agent to agent communication links between different servers, that would occur when the simulation is run.

2. The computer system of claim 1 where the program data further causes the computer system to automatically analyze the interactivity arc data structure in order to determine a subset of the plurality of agents, by calculating the number of interactivity arcs between the agents comprising the subset and the agents outside of the subset and determining that the number of interactivity arcs is the lowest possible based on the possible allocation of all of the agents across the at least one servers, and allocates the agent processes corresponding to the determined subset in a single server.

3. The computer system of claim 1 where the program data further causes the computer system to automatically analyze the interactivity arc data structure in order to identify an at least one subset of the plurality of agents where the number of interactivity arcs between the agents that are members of the at least one subset and the agents that are not members of the at least one subset is less than a predetermined threshold number of interactivity arcs.

4. The computer system of claim 1 where the program data further causes the computer system to automatically analyze the interactivity arc data structure to determine an allocation of the plurality of agents to an at least one subset of agents using a scoring calculation that utilizes an expected data communication workload for the at least one server comprising the computer system, said scoring system taking as input a number of interactivity arcs that are an at least one external arcs an at least one subset of the plurality of agents.

5. The computer system of claim 1 where the program data further causes the computer system to automatically analyze the interactivity arc data structure to determine an allocation of the plurality of agents to an at least one subset of agents using a scoring calculation that utilizes an expected communication overhead for at least one server comprising the computer system, said scoring calculation using a corresponding number of external arcs for the at least one subsets.

6. The computer system of claim 1 where the program data further causes the computer system to determine an at least one clique of agents represented in the interactivity arc data structure.

7. The computer system of claim 6 where the program data further causes the computer system to determine the at least one clique of agents by selecting a data representation of an agent comprising the simulation and recursively analyzing an at least one representation of an agent that is determined to be directly connected to the selected agent by a corresponding interactivity arc comprising the interactivity arc data structure.

8. The computer system of claim 6 where the program data further causes the computer system to determine the at least one clique of agents by running a convolution on an interactivity matrix representing a topology of the interactivity arcs represented by the interactivity arc data structure with a predetermined kernel.

9. The computer system of claim 1 where the program data further causes the computer system to determine an allocation of the agents to the at least one servers by determining at least one possible allocation, scoring each of the at least one possible allocations and selecting an allocation from the at least one possible allocations with the best corresponding score.

10. The computer system of claim 9 where the program data further causes the computer system to determine the score using data representing data communication volume between the at least one servers detected during an at least one prior runs of the simulation.

11. The computer system of claim 1 where the program data comprising further causes the computer system to determine the allocation by using data representing data communication volume between the at least one servers, said data detected during the operation of the simulation and to dynamically reassign the agent allocation during the simulation in dependence on the detected data.

12. A method executed by a computer system comprised of at least one server operatively connected using a data network for operating a multi agent simulation, the method comprising:

generating and storing in a computer memory an interactivity arc data structure said interactivity arc data structure comprised of data representing a plurality of interactivity arcs, said plurality of interactivity arcs further comprised of at least one interactivity arc encoding a direct communication link between a first agent process comprising the multi-agent simulation and a second agent process comprising the multi-agent simulation; and using the interactivity arc data structure to automatically allocate the plurality of agents to the at least one servers by automatically determining an optimal agent allocation that minimizes either the expected volume of direct data communication between pairs of agents residing on different servers or the expected number of direct agent to agent communication links between different servers, that would occur when the simulation is run.

13. The method of claim 12 further comprising: automatically determining a first and a second subset of the set of agents;

allocating to a first server the first subset of agents and to a second server, the second subset of agents, where the number of interactivity arcs between the first and second determined subsets of agents is the lowest possible based on the possible allocations of the plurality of agents across the servers comprising the computer system.

14. The method of claim 12 further comprising: automatically analyzing the interactivity arc data structure in order to allocate an at least one subset of the plurality of agents to a corresponding at least one server comprising the computer system, where the number of interactivity arcs between the at least one determined subsets is less than a predetermined threshold number of interactivity arcs.

15. The method of claim 12 further comprising: automatically analyzing the interactivity arc data structure to determine an allocation of the plurality of agents to at least one subset of agents using a scoring calculation that utilizes an expected data communication volume for at least one server using the number of interactivity arcs that cross from a first subset of agents to a second subset of agents for the at least one subset.

16. The method of claim 12 further comprising: determining at least one clique of agents represented by data comprising the interactivity data structure.

17. The method of claim 16 further comprising: determining the at least one clique by selecting an agent represented by the interactivity arc data structure and recursively analyzing the interactivity arcs between the selected agent and a neighboring pair of agents represented by the interactivity data structure.

18. The method of claim 16 further comprising determining the at least one clique of agents by running a convolution on an interactivity matrix representing the interactivity data structure with a predetermined kernel.

19. The method of claim 12 further comprising: determining an allocation of the agents to the at least one servers by determining at least one possible allocation, scoring each of the at least one possible allocations and selecting an allocation from the at least one possible allocations with the best corresponding score.

20. The method of claim 19 further comprising:
detecting data representing either data communication volume or the number of direct data communication links between the at least one servers detected during prior runs of the simulation; and
determining the score using the detected data.

21. The method of claim 12 further comprising:
running the simulation on the computer system using a first allocation of the agent processes across the servers;
detecting data representing either data communication volume or the number of data communication connections between the at least one servers detected during the simulation;
determining a second allocation of the agent processes to the at least one servers by using the detected data; and
reallocating the plurality of agents across the at least one servers by using the determined second allocation.

\* \* \* \* \*